United States Patent [19]

Zankich

[11] Patent Number: 5,108,237
[45] Date of Patent: Apr. 28, 1992

[54] TIEDOWN STRAP ASSEMBLY FOR RETAINING A VEHICLE DURING TRANSPORTATION

[75] Inventor: Frank A. Zankich, San Pedro, Calif.

[73] Assignee: Ancra Corporation, Hawthorne, Calif.

[21] Appl. No.: 650,214

[22] Filed: Feb. 4, 1991

[51] Int. Cl.⁵ .............................................. B60P 3/77
[52] U.S. Cl. ........................................ 410/21; 410/10; 410/50
[58] Field of Search ................... 410/3, 4, 7–12, 410/16, 19–23, 30, 47, 49, 50, 96, 100

[56] References Cited

U.S. PATENT DOCUMENTS

| | | | |
|---|---|---|---|
| 2.905,107 | 9/1959 | Nochol | 410/96 |
| 4,510,652 | 4/1985 | van Iperen | 410/12 X |
| 4,786,223 | 11/1988 | Crissy et al. | 410/20 |
| 4,913,608 | 4/1990 | Royball | 410/50 X |
| 4,960,353 | 10/1990 | Thorndyke | 410/20 |
| 5,011,347 | 4/1991 | Bullock | 410/20 X |

Primary Examiner—Robert J. Spar
Assistant Examiner—James Eller
Attorney, Agent, or Firm—Edward A. Sokolski

[57] ABSTRACT

A strap assembly has one or more cleat members slidably installed on the strap portion thereof. These cleat members have projections thereon which engage the tread of the tire of a vehicle to be retained in position for transportation on a rail car or other transport. The opposite ends of the strap assembly are secured to the body of the transport. A ratchet buckle or other such device is installed in series with the strap and is used to tighten down the strap against the vehicle tire.

3 Claims, 3 Drawing Sheets

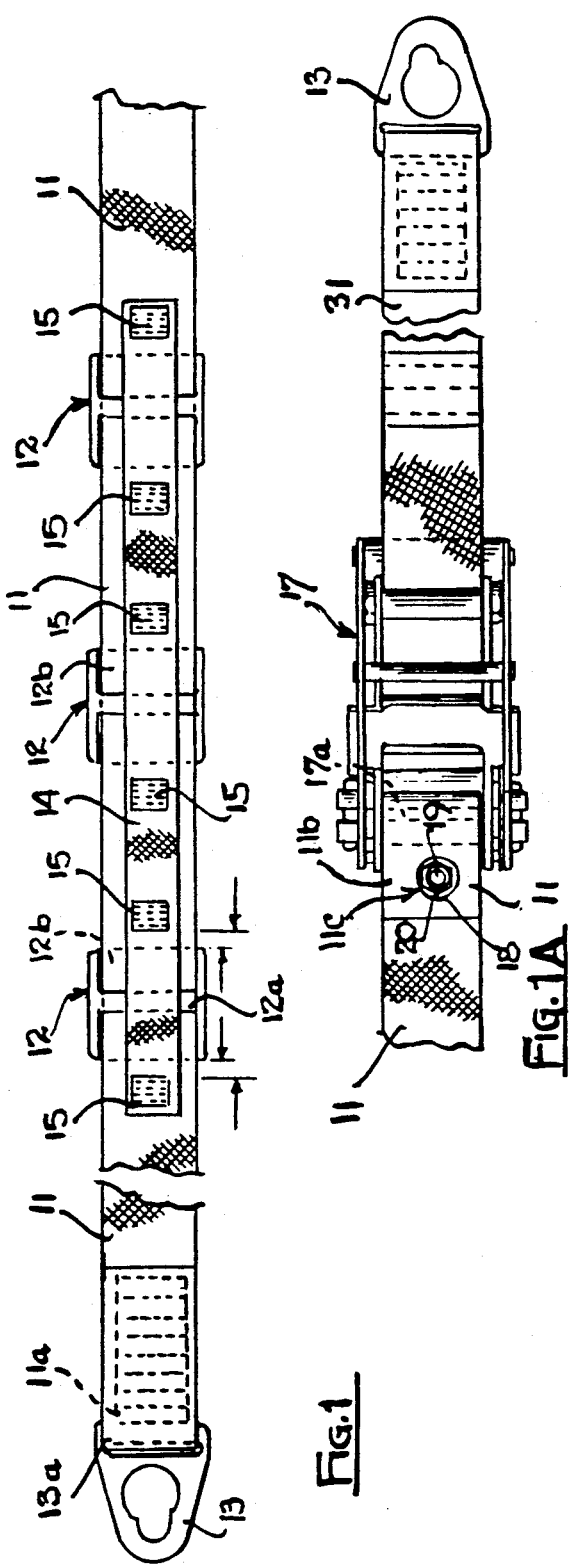
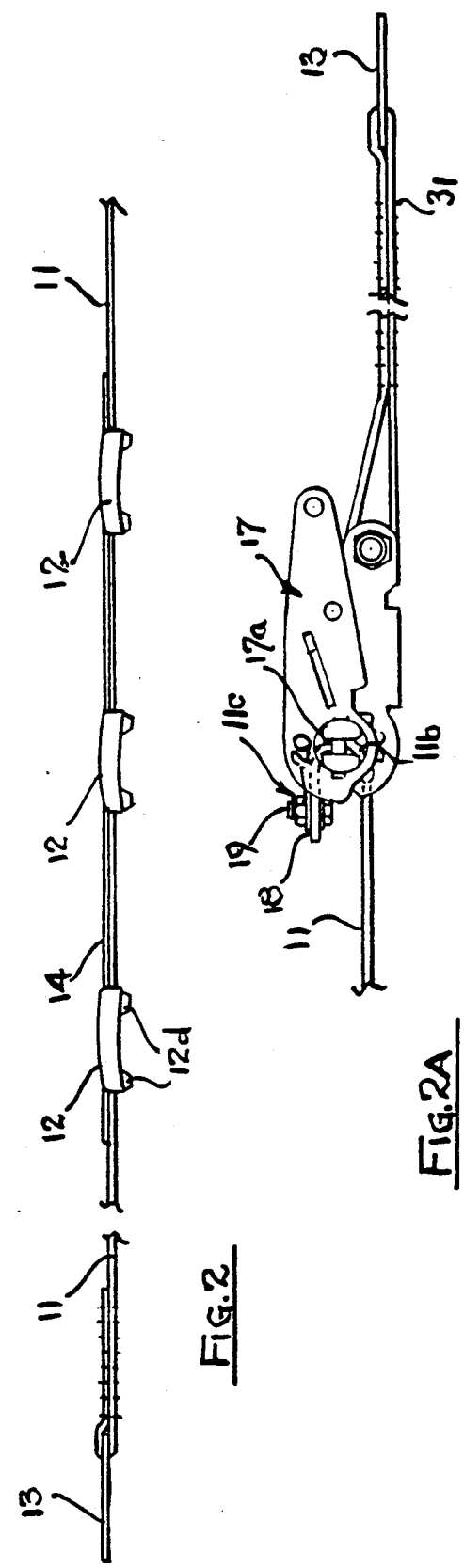

TIEDOWN STRAP ASSEMBLY FOR RETAINING A VEHICLE DURING TRANSPORTATION

BACKGROUND OF THE INVENTION

1. Field of the Invention

This invention relates to tiedown strap assemblies and more particularly to such an assembly for use in tying down the wheel of a vehicle during its transportation on a rail car or other transport.

2. Description of the Related Art

While automobiles and other vehicles are being transported on rail cars or other transports, they must be securely tied down to the frame of the transport. This end result is often accomplished by means of a harness type assembly which fits over the wheel of the vehicle. Each such harness is adapted for use with a particular size wheel so that a different harness must be employed for cars with different size wheels. With such prior art harness assemblies, a pair of moveable chocks are placed against the front and rear of the wheel and the harness then tightened down against the wheel by means of a winch or ratchet buckle attached to one of the straps of the harness.

SUMMARY OF THE INVENTION

The present invention provides a wheel tiedown which can be used with wheels of different sizes and is not limited for use with a single size wheel as are the harnesses of the prior art. This end result is achieved without sacrificing tiedown capabilities by employing one or more special cleats which are slidably installed on a tiedown strap which strap is anchored to the frame of the transport at its opposite ends. These cleats have projections thereon which engage the tread of the tire. The strap is tightened down to bring the cleats in firm engagement with the tire by means of a ratchet buckle or winch which is installed in the strap. Chocks are placed against the wheel, as in the prior art, to further help retain the wheel in position.

It is therefore an object of this invention to provide an improved tiedown strap assembly for retaining vehicles for transport wherein a single assembly can be used with a variety of different size wheels.

Other objects of the invention will become apparent from the following description in connection with the accompanying drawings.

BRIEF DESCRIPTION OF THE DRAWINGS

FIGS. 1 and 1A are top plan views of a preferred embodiment of the invention;

FIGS. 2 and 2A are side elevational views of the preferred embodiment of the invention;

DETAILED DESCRIPTION OF THE INVENTION

Figure 3:
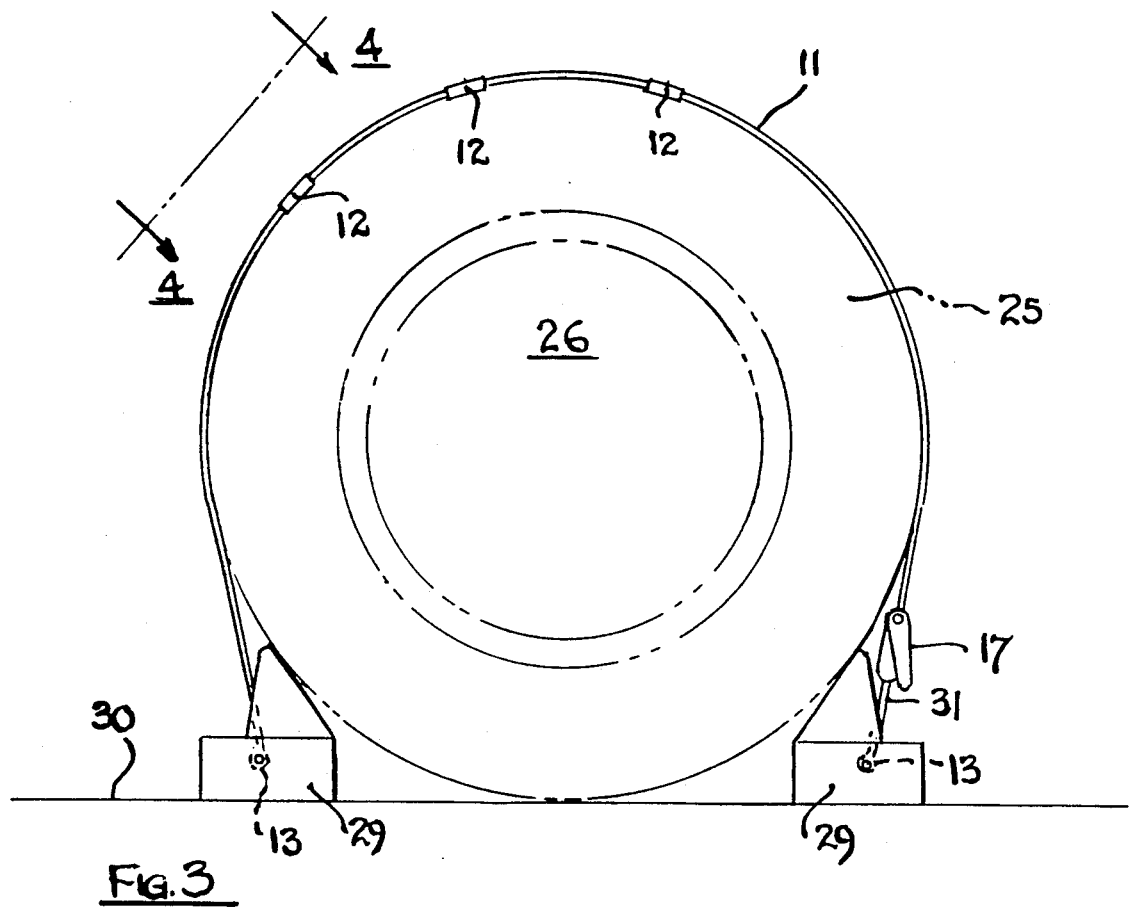
FIG. 3 illustrates the device of the invention in use in tying down a vehicle wheel.

Referring to FIGS. 1 and 2, a preferred embodiment of the invention is illustrated. A wider strap 11 is fitted between cross arm 12a and base 12b of each of cleats 12. One end 11a of strap 11 is fitted through slot 13a of attachment member 13 this end portion being doubled back on itself and stitched together. A narrower strap 14 is fitted over the cross arms of the cleats and stitched to strap 11 at points 15.

Ratchet buckle 17 is attached to the end portion 11b of strap 11. Strap 31 is attached to the ratchet buckle and has an attachment number 13 connected thereto. This ratchet buckle may be of the type described in U.S. Pat. No. 4,185,360 issued Jan. 29, 1980 to Ernest Prete, Jr. et al. End portion 11b of strap 11 has an aperture 11c therein in which grommet 18 and bolt 19 are installed. Nut 20 is attached to the end of bolt 19. End portion 11b is run through slot 17a of the buckle with the nut and bolt removed and such nut and bolt then installed to retain the strap to the buckle.

Referring now to FIGS. 5-8, the cleat of the preferred embodiment is illustrated. Cleat 12 has a cross arm 12a and a base portion 12b with a slot 12c being formed therebetween. A pair of projections 12d extend downwardly from base portion 12b. Wider strap 11 is installed through slot 12c and narrower strap 14 runs over the top of cross arm 12a. While two projections 12d are shown, a single such projection may be employed. The projections may be designed to accommodate different tire tread designs, a cleat with a single projection being more readily usable with a variety of different tire tread designs.

Figure 4:
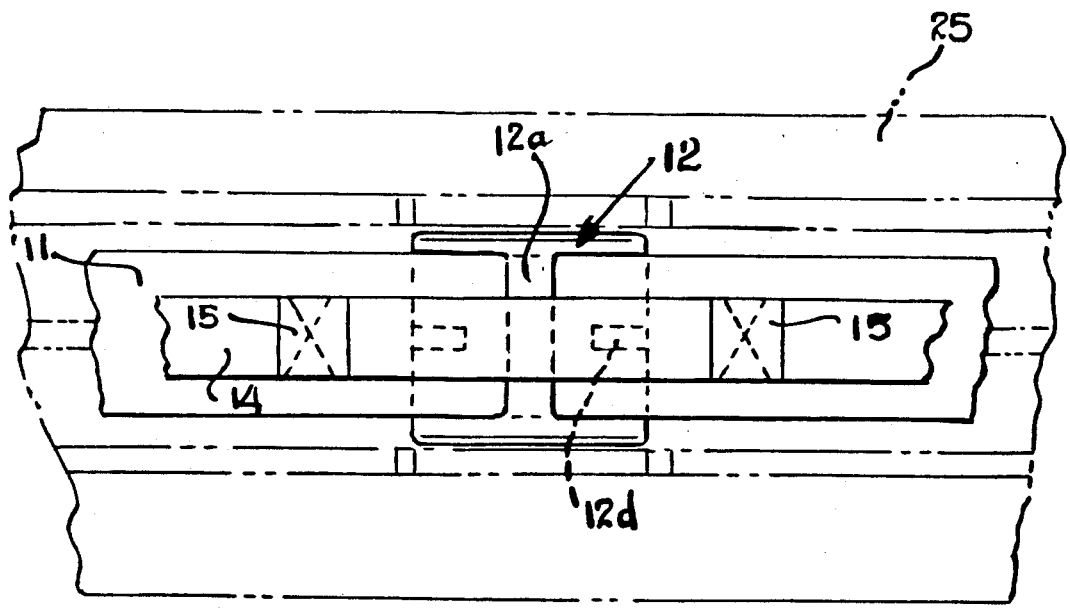
FIG. 4 is a view taken along the plane indicated by 4—4 in FIG. 3.
Figure 5:
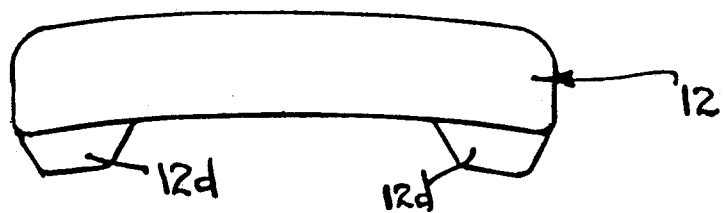
FIG. 5 is a side elevational view of a cleat of the preferred embodiment.
Figure 7:
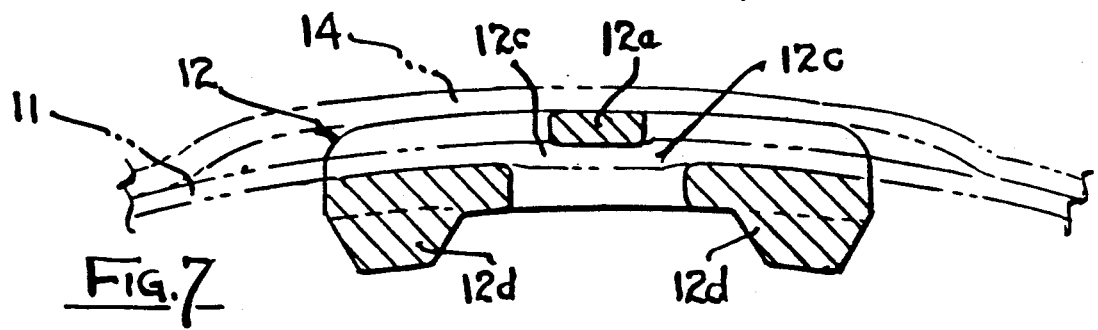
FIG. 7 is a cross sectional view taken along the plane indicated by 7—7 in FIG. 6.
Figure 6:
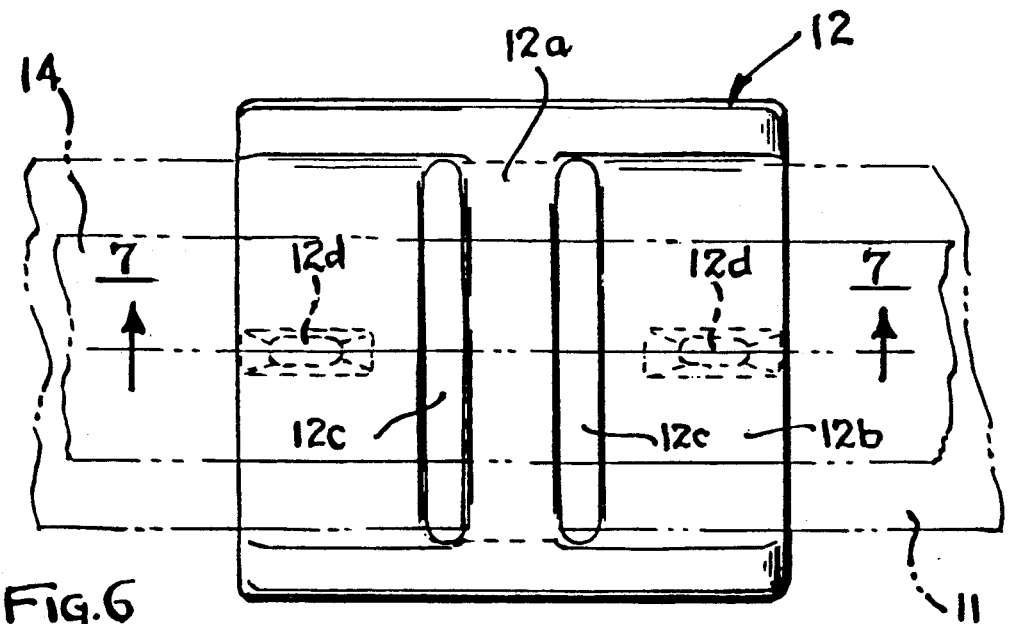
FIG. 6 is a top plan view of the cleat of the preferred embodiment.
Figure 8:
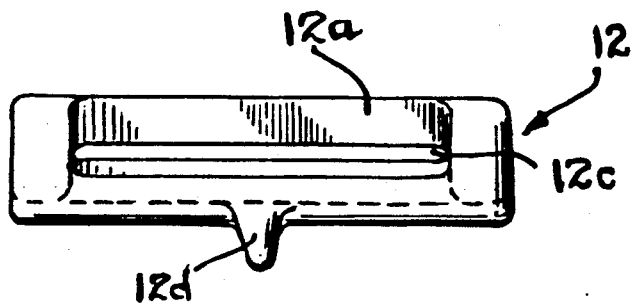
FIG. 8 is an end elevational view of the cleat of the preferred embodiment.

Referring now to FIGS. 3 and 4, the use of the device of the invention is tying down the wheel of a vehicle is illustrated. The strap 11 of the device of the invention is fitted around the tire 25 of vehicle wheel 26 with the projections 12d of cleats 12 fitted in one of the treads of the tire. Attachment member 13 at one end of strap 11 is anchored on fitting 29 attached to the floor of the transport while attachment member 13 at the end of strap 31 is anchored to a similar fitting 29. The strap is tightened against tire 25 by means of ratchet buckle 17 with the projections 12d of the cleats firmly clamping against the tire in the tread thereof. It is to be noted that the cleats are only subjected to compression loads, the tension loads passing only through the straps, thus permitting the use of less bulky cleats. The engagement of the cleats in the tread prevents lateral slippage of the strap. The cleats are permitted limited longitudinal freedom of motion to facilitate proper tread engagement. While several cleats are shown in the preferred embodiment, a single cleat could be used for certain applications.

While the invention has been described and illustrated in detail, it is to be clearly understood that this is intended by way of illustration and example only and is not to be taken by way of limitation, the scope of the invention being limited only by the terms of the following claims:

I claim:

1. A strap assembly for tying down the wheel of a vehicle having a treaded tire to a transport comprising:
   a first elongated strap having a first end and a second opposite end;
   at least one cleat member, said cleat member having a base portion, a cross arm spaced from said base portion, said cross arm having a bottom side and a top side, a slot formed between said base portion and said cross arm through which said first strap is slidably fitted, said first strap running under said bottom side of said cross arm, and at least one projection extending from said base portion in a direction away from said strap and projecting substantially perpendicular relative to a broad surface of said strap;

means for anchoring said first end and said second end of said first strap to said transport;

means for tightening said first strap against said tire with the at least one projection of said cleat member fitted within a tread of said tire and clamping thereagainst; and a second strap secured to said first strap and running substantially parallel to said first strap, said second strap running over the top side of said cross arm and above said slot.

2. The strap assembly of claim 1 comprising a plurality of said cleat members through which said first strap is fitted, each of said cleat members having a pair of said projections.

3. The strap assembly of claim 1 wherein the means for tightening said first strap comprises a ratchet buckle.

* * * * *